United States Patent [19]

McLeod

[11] 4,432,651
[45] Feb. 21, 1984

[54] APPARATUS FOR MIXING VAPOR AND LIQUID PHASES OF ANHYDROUS AMMONIA

[75] Inventor: David M. McLeod, Freeland, Mich.

[73] Assignee: The Dow Chemical Company, Midland, Mich.

[21] Appl. No.: 385,194

[22] Filed: Jun. 4, 1982

[51] Int. Cl.³ .............................................. B01F 3/04
[52] U.S. Cl. ................................... 366/336; 366/150; 366/174; 138/42; 138/44; 48/180 R
[58] Field of Search ............. 366/174, 336, 337, 338, 366/134, 340, 150; 48/180 R, 180 B; 138/37, 138/39, 42, 44; 137/896

[56] References Cited

U.S. PATENT DOCUMENTS

| | | | |
|---|---|---|---|
| 563,978 | 7/1896 | Meinshausen | 366/174 |
| 2,055,836 | 9/1936 | Cowles | 366/174 |
| 2,511,291 | 6/1950 | Mueller | 366/338 |
| 2,977,205 | 3/1961 | Austin | 48/180 R |
| 3,984,087 | 10/1976 | Rathnow et al. | 366/340 |
| 4,222,524 | 9/1980 | Garcia | 138/37 |

Primary Examiner—Stephen Marcus
Assistant Examiner—Brian J. Bowman
Attorney, Agent, or Firm—V. Dean Clausen

[57] ABSTRACT

An apparatus is disclosed which is useful for mixing a vapor phase stream of anhydrous ammonia with a liquid phase stream of anhydrous ammonia, to obtain a homogeneous, vapor-liquid mixture of the anhydrous ammonia. Basic components of the apparatus include a conventional meter regulator and flow equalizer manifold. In this invention the manifold is modified by adding a flow integrator ring which enhances mixing of the vapor phase and liquid phase streams of ammonia. The mixing apparatus described herein is particularly suitable for use in a field applicator, for applying anhydrous ammonia to the soil as a nitrogen fertilizer.

2 Claims, 4 Drawing Figures

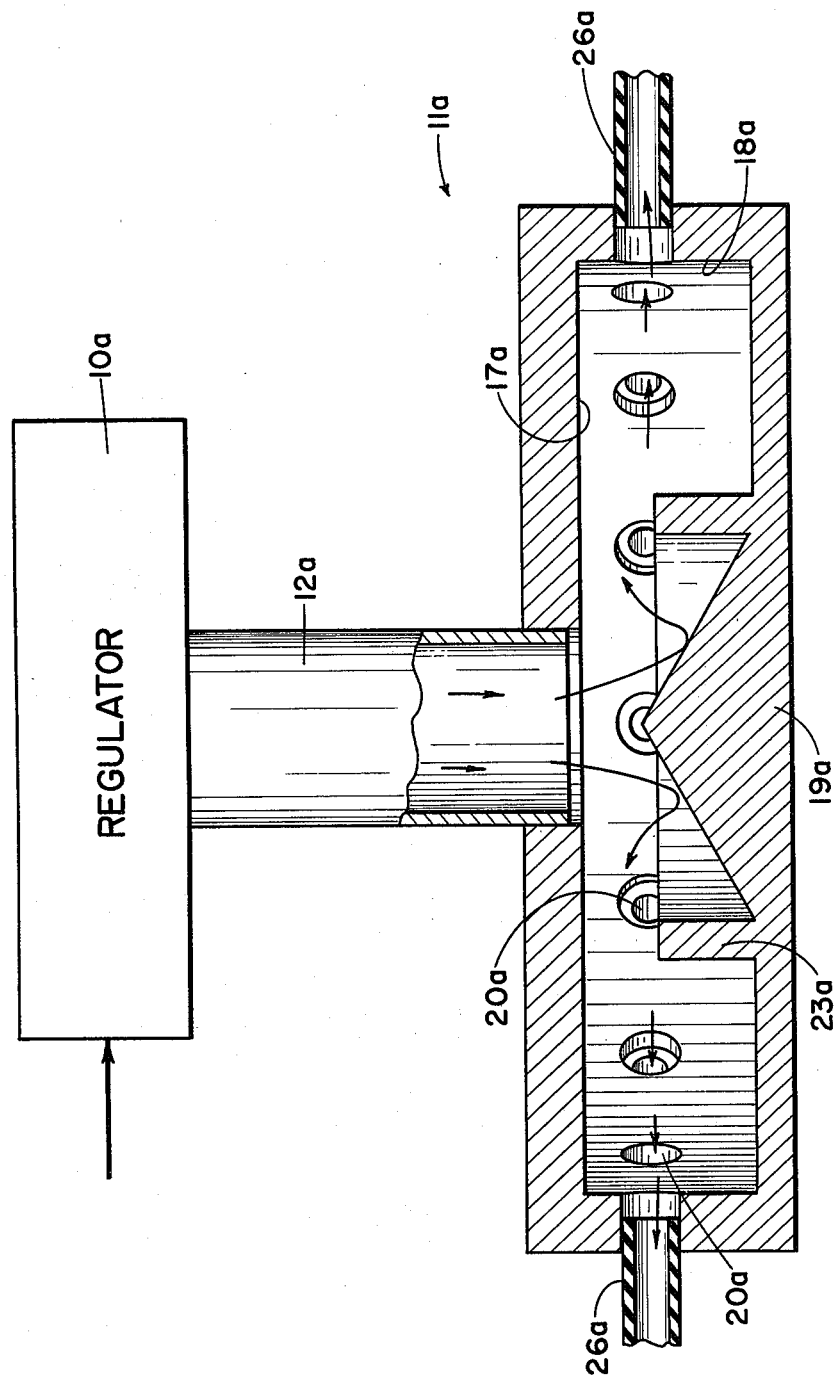

APPARATUS FOR MIXING VAPOR AND LIQUID PHASES OF ANHYDROUS AMMONIA

BACKGROUND OF THE INVENTION

The invention relates to an apparatus for mixing the vapor and liquid phases of anhydrous ammonia, to obtain a homogeneous, vapor-liquid mixture of the ammonia, which can be applied uniformly to soil, feed grains, silage, and the like.

A common use for anhydrous ammonia is to apply it to the soil as a nitrogen fertilizer. Conventional field applicators for applying the ammonia usually include a storage tank, a meter regulator, a flow equalizer manifold having a fixed or variable orifice, and a row of knives which are pulled through the soil at a depth of several inches. In a typical field application, the ammonia is stored in the tank at about 100–200 psig at ambient temperature. As the ammonia is metered through the regulator and into the flow equalizer manifold, the pressure drops to about 5–30 psig. Because ammonia has a relatively high vapor pressure, and because it enters the manifold at a relatively low pressure, the product is mostly in the vapor phase when it reaches the manifold that is, the ammonia composition is about 90 percent vapor and 10 percent liquid ammonia on a volume basis.

From the meter regulator, the liquid and vapor phases pass through a connector pipe which communicates with the flow equalizer manifold. The manifold structure is a circular chamber having openings in the side wall of the chamber and a cone-shaped bottom. Flexible applicator hoses connect the chamber wall openings to the soil knives. Inside the chamber is an orifice sleeve which seats against the chamber wall. This sleeve has openings in it which are smaller than the openings in the chamber wall and the openings in the sleeve line up with those in the chamber wall.

Because the ammonia is a two-phase system when it enters the flow equalizer manifold, it does not distribute uniformly through the applicator hoses into the soil knives. The distribution problem is caused by a centrifuging effect, in which the liquid phase is thrown to the outside of the manifold chamber. As the liquid phase travels around the manifold chamber, therefore, most of the liquid is discharged through the first few openings that it crosses in the orifice ring and the chamber sidewall. At the same time, the vapor phase of the ammonia leaves the manifold through those openings which offer the least amount of resistance.

From a study of the problem described above, it was concluded that the liquid and vapor phases of the ammonia had to be homogenized inside the manifold to improve the distribution of the product to the soil knives. In the practice of the present invention, a much better distribution of the ammonia product is achieved by modifying the conventional flow equalizer manifold used for the field application of ammonia fertilizers.

SUMMARY OF THE INVENTION

The apparatus of the this invention is designed for mixing a vapor phase stream and a liquid phase stream of anhydrous ammonia, to obtain a homogenized, vapor-liquid mixture of the ammonia. The basic apparatus includes a meter regulator and a flow equalizer manifold which communicates with the meter regulator. The flow equalizer manifold has a circular chamber which is defined by top wall, a floor, and a common sidewall. The chamber floor has a cone-shaped surface and the sidewall has outlet openings therein which communicate with a use point. Inside the manifold is an orifice sleeve which surrounds the cone-shaped surface and which sits against the sidewall of the chamber. The orifice sleeve also has openings therein which communicate with the outlet openings in the chamber sidewall. A flow integrator ring is positioned inside the orifice sleeve and it seats on the cone-shaped surface of the chamber floor.

DESCRIPTION OF THE DRAWINGS

FIG. 4 is an elevation view, mostly in section and partly schematic, of the meter regulator and the flow equalizer manifold of another embodiment of the ammonia mixing apparatus of this invention.

DESCRIPTION OF A PREFERRED EMBODIMENT

Figure 1:
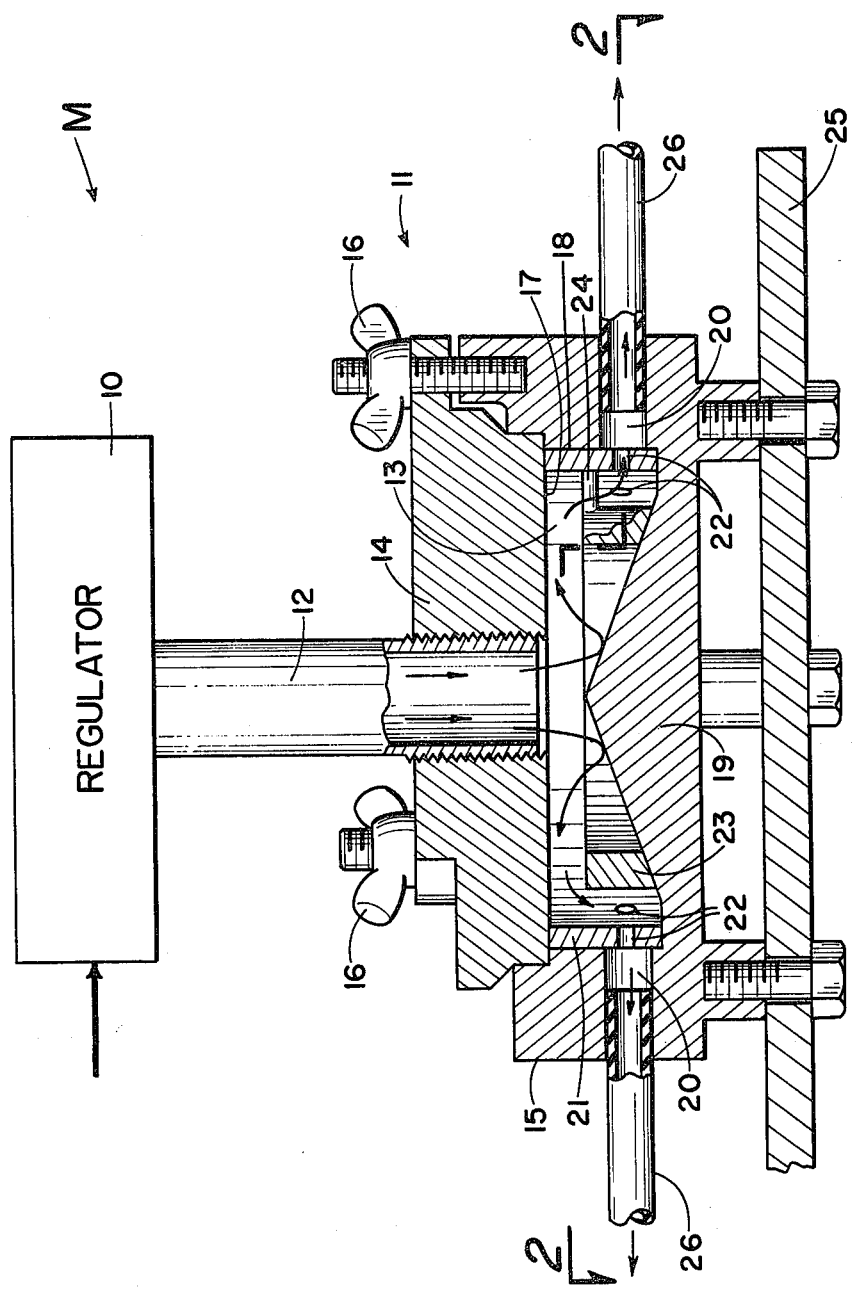
FIG. 1 is an elevation view, mostly in section and partly schematic, of the meter regulator and the flow equalizer manifold of one embodiment of the ammonia mixing apparatus of this invention.
Figure 2:
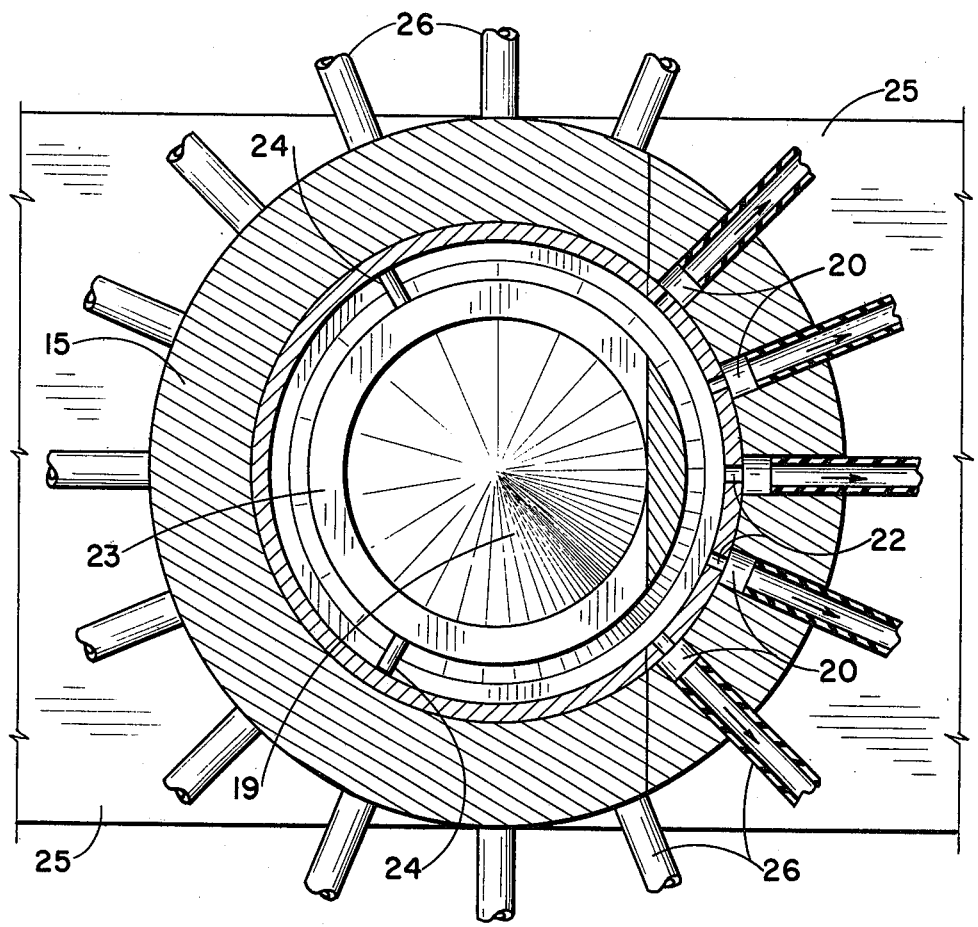
FIG. 2 is a view of the mixing apparatus of FIG. 1 as taken on line 2—2.
Figure 3:
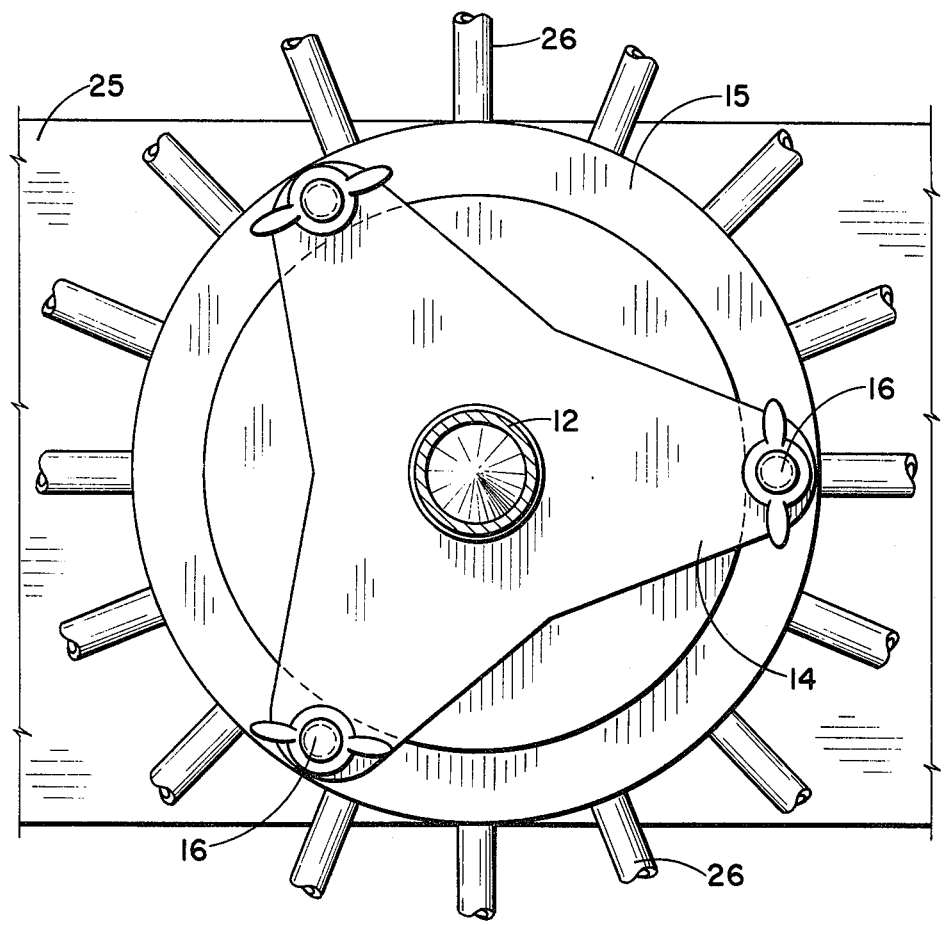
FIG. 3 is a view of the mixing apparatus of FIG. 1 as taken on line 3—3.

In the drawings, referring particularly to FIG. 1, the mixing apparatus of this invention is generally indicated by the letter M. The basic apparatus consists of a meter regulator 10 and the flow equalizer manifold, generally indicated by numeral 11. A connector pipe coil 12 connects the regulator into a circular chamber 13 defined within the manifold 11. Chamber 13 is defined by a cover plate 14, which is secured to a body member 15 by several stud and wing nut fasteners 16.

Specifically, the top wall 17 of chamber 13 is formed by the bottom surface of cover plate 14, and a cirucular opening in the body member 15 forms the sidewall 18 and the floor 19 of the chamber 13. As noted in the drawing, the floor 19 of chamber 13 has a cone-shaped surface and sidewall 18 has outlet openings 20 therein which are spaced around the sidewall. An orifice sleeve 21 is positioned inside of chamber 13. This sleeve surrounds the cone-shaped suface of the chamber floor 19 and the outside of the sleeve sits against the chamber sidewall 18. Sleeve 21 also has openings 22 therein, which communicate with the openings 20 in sidewall 18.

Manifold 11 also includes a flow integrator ring 23. As best shown in FIG. 1, this ring is positioned inside the orifice sleeve 21 and its seats down onto the cone-shaped surface of the chamber floor 19. Ring 23 is held in a central position on the cone-shaped surface by pin members 24, which are fastened to the ring and which make contact with the orifice sleeve 21. Manifold 11 is attached to a mounting bracket 25, which is a part of the field applicator (not shown). In the mixing apparatus of this invention, the meter regulator 10 and the flow equalizer manifold 11, except for the the flow integrator ring 23, are parts of a conventional field applicator which is in common use.

OPERATION

The invention can be illustrated by describing a typical operation in which anhydrous ammonia is applied to the soil as a nitrogen fertilizer. At the start of the operation, the anhydrous ammonia is metered from the storage tank on the field applicator (not shown) through the meter regulator 10. As mentioned earlier, the ammonia enters the regulator at a pressure of about 100–200 psig and leaves the regulator at a pressure at about 5–30 psig. Because of the pressure drop inside the regulator, much of the ammonia leaves the regulator 10 and enters chamber 13 of the manifold 11 as a vapor phase (about 90 percent by volume).

As the ammonia passes downwardly through the connector pipe 12, the liquid phase circulates against the wall of the pipe in a helical flow pattern, and the vapor phase passes straight through the center of the connector pipe. The liquid phase, being heavier than the vapor phase, drops onto the cone-shaped surface of the chamber floor 19 and tends to bounce upwardly as it strikes the cone. The turbulence of the incoming vapor phase stream atomizes the liquid phase and thus initiates a good mixing of the liquid and vapor phases to give a vapor-liquid mixture which is a homogeneous composition.

Good mixing of the liquid and vapor phases of the ammonia in chamber 13 of manifold 11 is achieved primarily because the flow integrator ring 23 has a restraining function which creates a back pressure on the ammonia mixture. Specifically, ring 23 provides a dam which holds back some of the liquid long enough for it to thoroughly mix with the incoming vapor phase, before the liquid has a chance to push through the openings 22 in the orifice sleeve, and the openings 20 in the chamber sidewall, and thus be carried into the soil knives (not shown) through the applicator hoses 26.

A second embodiment of the ammonia mixing apparatus of this invention is illustrated in FIG. 4. In this embodiment, the meter regulator 10a is connected into a flow equalizer manifold, generally indicated by numeral 11a, by a cover plate 12a. The manifold 11a is an integral (one-piece) structure defined by a circular chamber 13a, which includes a top wall 17a, a sidewall 18a, a floor 19a, which has a cone-shaped surface. Surrounding the base of the cone in floor 19a is an upstanding ring which provides a flow integrator ring 23a. Spaced around the sidewall 18a are outlet openings 20a, through which the ammonia product is carried into the applicator hoses 26a and then to the soil knives (not shown). The embodiment of FIG. 4 thus differs from the embodiment illustrated in FIG. 1 in that the flow equalizer manifold in FIG. 4 is fabricated as a one-piece structure, and the manifold does not include an orifice sleeve.

In the practice of this invention, several field tests were conducted to determine the effect the flow integrator ring has on distribution of the ammonia fertilizer to the soil knives. The procedure involved installing a removable metal coil on the field applicator above each soil knife (between the flow equalizer manifold and each knife). As the applicator is pulled across a field, the ammonia is trapped in each coil and the coil is thereafter removed from the applicator and weighed. The ammonia is then removed from each coil and the dry weight of the coil is recorded.

In the first series of tests, the flow integrator ring 23 was not installed in the flow equalizer manifold 11, so that the manifold included only the orifice sleeve 21. Following this, a second series of tests was conducted in which both the flow integrator ring and the orifice sleeve were placed in the flow equalizer manifold, as illustrated in FIG. 1. In the first series of tests, in which the flow integrator ring was not included in the manifold, the amount of ammonia delivered to each soil knife had an average coefficient of variation which ranged from 30 percent to 178 percent, weight basis. In the second series of tests, in which both the flow integrator ring and orifice sleeve were used, the coefficient of variation for distribution of the ammonia to each soil knife was in the range of 10–12 percent, weight basis.

It was also observed, in the practice of this invention, that use of only the flow integrator ring in the flow equalizer manifold, as shown in the embodiment of FIG. 4, improved the distribution of the ammonia product to the soil knives over the distribution values resulting in the first series of tests in which only the orifice sleeve was placed in the flow equalizer manifold. However, the best distribution of the ammonia product is achieved when both the flow integrator ring and orifice sleeve are used, as in the embodiment shown in FIG. 1. This is particularly true when the delivery rate of the ammonia is in the low range, for example, about 200–800 pounds per hour.

The invention claimed is:

1. An apparatus for mixing a vapor phase stream of anhydrous ammonia with a liquid phase stream of anhydrous ammonia, to obtain a homogeneous, vapor-liquid mixture of said anhydrous ammonia, the apparatus comprising:

a meter regulator means, a flow equalizer manifold in communication with the meter regulator means, the manifold includes a circular chamber defined by a top wall, a floor, and a sidewall, the chamber communicates with the meter regulator, the chamber floor has a cone-shaped surface, and the chamber sidewall has outlet openings therein which communicate with a use point;

the manifold includes an orifice sleeve, the sleeve is positioned inside the chamber, it surrounds the cone-shaped surface, it is in contact with the chamber sidewall, and it has openings therein which communicate with the outlet openings in the chamber sidewall;

the manifold includes a flow integrator ring, the flow integrator ring is positioned inside the orifice sleeve, and it seats on the cone-shaped surface of the chamber floor.

2. An apparatus for mixing a vapor phase stream of anhydrous ammonia with a liquid phase stream of anhydrous ammonia, to obtain a homogeneous, vapor-liquid mixture of said anhydrous ammonia, the apparatus comprising:

a meter regulator means;

a flow equalizer manifold in communication with the flow meter regulator means;

the flow equalizer manifold is an integral structure which includes a circular chamber defined by a top wall, a floor and a sidewall, the chamber communicates with the meter regulator, the chamber floor has a cone-shaped surface, with an upstanding flow integrator ring at the base of the cone-shaped surface, and the chamber sidewall has outlet openings therein which communicate with a use point.

* * * * *